United States Patent
Kunjukrishnan

(10) Patent No.: US 10,880,382 B2
(45) Date of Patent: Dec. 29, 2020

(54) CONFIGURING MEANING AND STATE CONDITIONS FOR PAIRED IOT DEVICES

(71) Applicant: T-Mobile USA, Inc., Bellevue, WA (US)

(72) Inventor: Syam Kunjukrishnan, Sammamish, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 39 days.

(21) Appl. No.: 16/388,708

(22) Filed: Apr. 18, 2019

(65) Prior Publication Data

US 2020/0336548 A1    Oct. 22, 2020

(51) Int. Cl.
  *H04L 1/00*    (2006.01)
  *H04L 29/08*    (2006.01)

(52) U.S. Cl.
  CPC ............ *H04L 67/141* (2013.01); *H04L 67/12* (2013.01)

(58) Field of Classification Search
  None
  See application file for complete search history.

(56) References Cited

U.S. PATENT DOCUMENTS

| 10,075,539 B1 * | 9/2018 | Sabur | G06F 3/167 |
| 10,382,203 B1 * | 8/2019 | Loladia | H04L 9/30 |
| 2011/0320535 A1 * | 12/2011 | Donaldson | H04W 12/003 709/204 |
| 2015/0121470 A1 * | 4/2015 | Rongo | H04L 63/083 726/4 |
| 2015/0163843 A1 * | 6/2015 | Zhu | H04W 76/11 455/41.2 |
| 2016/0072839 A1 * | 3/2016 | Mortimore, Jr. | H04L 63/20 726/1 |
| 2016/0150350 A1 * | 5/2016 | Ingale | H04W 12/08 370/255 |
| 2016/0337322 A1 * | 11/2016 | Kang | H04L 63/08 |
| 2016/0360341 A1 * | 12/2016 | Srivatsa | H04M 1/7253 |
| 2017/0142588 A1 * | 5/2017 | Marjou | H04L 61/2589 |
| 2017/0231015 A1 * | 8/2017 | Jang | H04W 12/003 |
| 2017/0359338 A1 * | 12/2017 | Tschofenig | G06F 21/34 |
| 2018/0007055 A1 * | 1/2018 | Infante-Lopez | H04W 4/80 |
| 2018/0146367 A1 * | 5/2018 | Altin | H04W 12/02 |
| 2018/0167435 A1 * | 6/2018 | Kinarti | H04L 65/602 |
| 2019/0037361 A1 * | 1/2019 | Nakamura | H04W 4/70 |

(Continued)

*Primary Examiner* — Kwang B Yao
*Assistant Examiner* — Juvena W Loo
(74) *Attorney, Agent, or Firm* — Han Santos, PLLC; Nabil A. Abdalla

(57) ABSTRACT

An Internet of Things (IoT) pairing controller is described that enables an end-user to customize the implementation of IoT devices. The IoT pairing controller may receive a pairing request to pair a combination of active-active IoT devices or active-passive IoT devices. The IoT pairing controller may facilitate a selection of a pairing signal type that is used to pair the IoT devices, such as light, sound, heat, Bluetooth, and Wi-Fi. An end-user may select multiple pairing signal types, of which the IoT pairing controller may toggle between based on ambient environmental conditions, or as a failsafe confirmation of a "not sensed" pairing condition between IoT devices. The IoT pairing controller may associate client-defined statements with paired (i.e. sensed") and unpaired (i.e. "not sensed") pairing conditions of a pair of IoT devices.

20 Claims, 8 Drawing Sheets

(56) References Cited

U.S. PATENT DOCUMENTS

| | | | |
|---|---|---|---|
| 2019/0253243 A1* | 8/2019 | Zimmerman | H04L 9/0637 |
| 2019/0357023 A1* | 11/2019 | Park | H04L 67/12 |
| 2020/0059976 A1* | 2/2020 | Bhatia | G06F 15/76 |
| 2020/0120500 A1* | 4/2020 | Sharma | H04W 12/02 |
| 2020/0186985 A1* | 6/2020 | Dinata | G06F 9/547 |
| 2020/0213829 A1* | 7/2020 | Sundar Pal | H04W 76/18 |

* cited by examiner

CONFIGURING MEANING AND STATE CONDITIONS FOR PAIRED IOT DEVICES

BACKGROUND

The "Internet of Things" (IoT) refers to the interconnection of uniquely-identifiable embedded devices within the internet infrastructure. Ultimately, an IoT device is expected to result in new, wide-ranging types of applications in which virtually any type of physical thing may provide information about itself or its surroundings and/or may be controlled remotely via client devices of the Internet.

However, IoT development and adoption has been slow due to issues related to a lack of standardization. For example, one obstacle to IoT development and its adoption is that no standard platform exists to allow developers to design and offer new IoT devices and services. An IoT developer must design for network protocols and infrastructure, hardware, software, and services required to support the desired IoT implementation. As a result, each provider of IoT devices uses proprietary techniques for designing and connecting the IoT devices, making the adoption of multiple types of IoT devices burdensome for end-users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
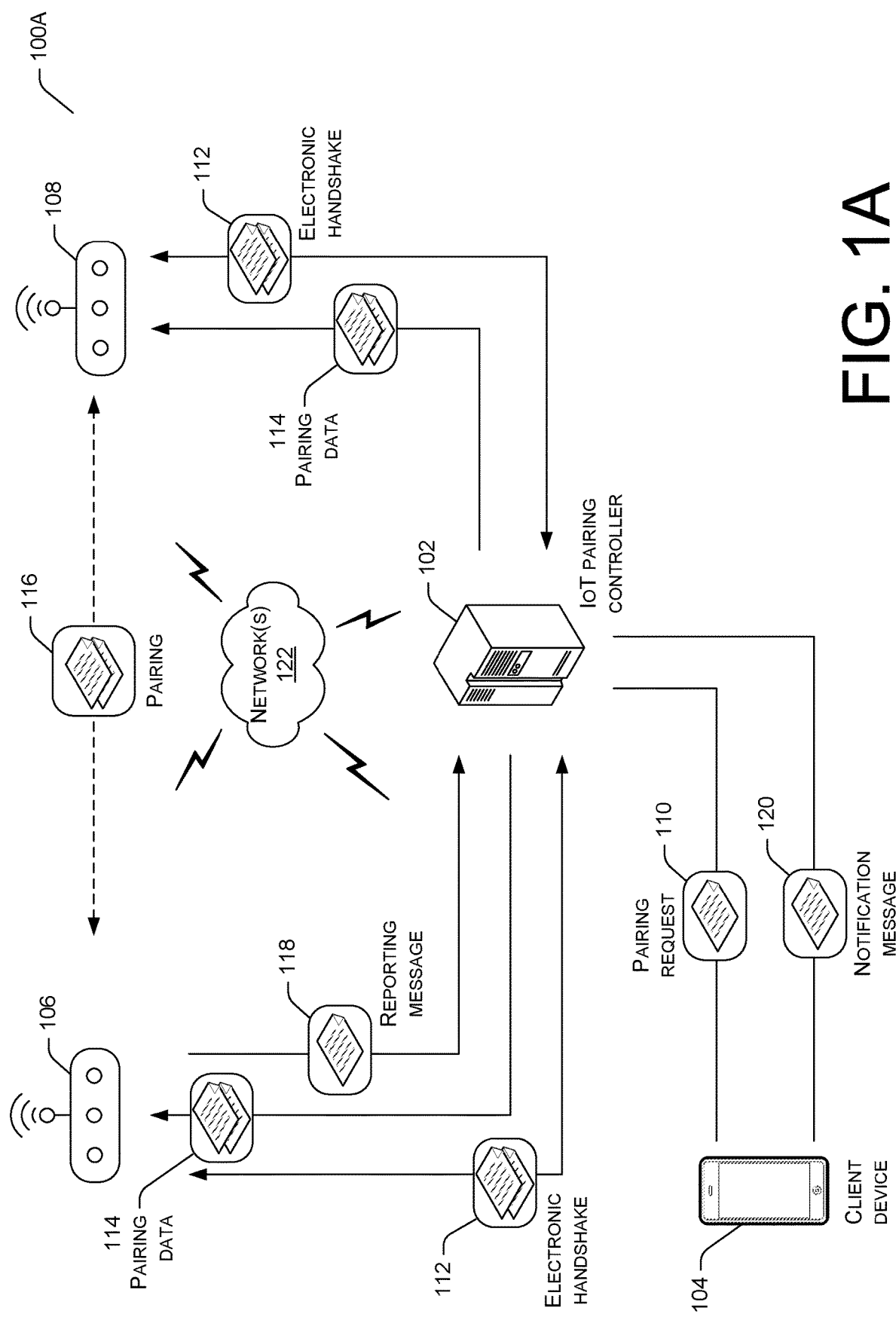
FIG. 1 illustrates a computing environment that facilitates an operation of an IoT pairing controller.

Aspects of the present disclosure relate generally to Internet of Things (IoT) platforms, apparatuses, and methods. This disclosure describes techniques that relate to generating an IoT platform that enables end-users to customize an operation and implementation of IoT devices to suit their personal preferences. Present day, the IoT marketplace offers a plethora of IoT devices that each perform a specific function, in a specific circumstance, and in a specific way. By way of example, in today's IoT market an IoT device offering may comprise an IoT device that can monitor whether a household door (e.g. front door or a garage door) is open or closed. In this example, the IoT device may comprise two sensors connected by an infrared beam. When the sensors are misaligned, and the continuity of the infrared beam is obstructed, the IoT device may report the same to a processing device, which may, in turn, infer that the household door is open. However, at times, an IoT device that relies on a single sensor type, such as the infrared beam, may not perform its intended function in all environments. For example, in an environment where the sensors are subject to high-intensity, direct sunlight, the sensors may mistakenly interpret the direct sunlight as a continuity of the infrared beam from the other sensor. Thus, the IoT device may fail to perform its intended function due to the limitations of its IoT platform.

This disclosure describes an IoT pairing controller that can facilitate an end-user to configure a pair of IoT devices to toggle between different pairing signal types (i.e. light, sound, infra-red, heat, Radio Frequency (RF) signal, and/or so forth), and in some cases, automatically toggle between different pairing signal types based on detected ambient conditions. Continuing with the above example, consider a set of paired IoT devices that are paired using an infrared beam. In some environments, the IoT devices may mistakenly interpret high-intensity, direct sunlight as a continuity of the infrared beam. To avoid such occurrences, the techniques described herein facilitate monitoring ambient conditions that correlate with a medium of a pairing signal type, and then selectively toggling to a different pairing signal type, such as sound, if the ambient light conditions necessitate the change and correlate the signals of the pair of IoT devices with one another to confirm and corroborate a semantic interpretation, in this case, whether the household door is open.

Further, the IoT pairing controller can report client-defined statements to a client device based on a "sensed" pairing condition or a "not sensed" pairing condition of a pair of IoT devices. For example, an end-user may position a pair of IoT devices in a vehicle garage on either side of a space in which a vehicle is typically parked. In this example, a "sensed" pairing condition can imply that a vehicle is not parked in the garage since the continuity of the pairing signal between the pair of IoT devices is unobstructed while the vehicle is not parked in the garage. Thus, the IoT pairing controller may facilitate an end-user to associate a client-defined statement of "there is no vehicle in the garage" with a "sensed" pairing condition of the pair of IoT devices. Similarly, the end-user may associate an additional client-defined statement of "vehicle parked in the garage," with a "not sensed" state of the pair of IoT devices. In this latter example, the presence of a vehicle would presumably obstruct the continuity of the pairing signal between the pair of IoT devices.

Moreover, consider an end-user configuring a pair of IoT devices to monitor movements of an individual within a fixed space, such as a bed, a room, or a building. In one example, consider monitoring an individual's movement out of a bed. In this example, the IoT pairing controller can facilitate configuring a pair of IoT devices to detect when an individual moves out of a bed, by fixing a first IoT device to the bed and a second IoT device to an article worn by the individual. More specifically, the second IoT device may be a wearable device that includes an attachment mechanism that can attach to the individual's person or a clothing article worn by the individual. Further, the end-user may configure the pair of IoT devices, via the IoT pairing controller, to associate a first client-defined statement of "individual in bed," with a "sensed" pairing condition between the IoT devices, and a second client-defined statement of "individual out of bed," with a "not sensed" pairing condition between the IoT devices. The IoT pairing controller may facilitate selection of a pairing signal type that does not require a direct line-of-sight between paired IoT devices in order to establish a "sensed" pairing condition (i.e. light-based pairing signal type). Doing so may avoid a "not sensed" pairing condition being mistakenly registered when an individual moves within the bed (e.g. turns over), rather than when the individual moves out of the bed.

In another example, consider monitoring an individual's movement within a room or a building. In this example, the IoT pairing controller can facilitate configuring a pair of IoT devices to detect when an individual moves out of a room or a building. As such, for brevity, and ease of description, the pair of IoT devices may be similar to the pair of IoT devices described above in the example of monitoring an individual in bed. However, since monitoring an individual's movement within a room or a building involves a larger space, the IoT pairing controller can facilitate a selection of a different, and more appropriate, pairing signal type, such as a Bluetooth signal, or a Wi-Fi signal, the selection of each depending on the size of the room, and range of the Bluetooth and Wi-Fi signals.

It is noteworthy that the terms "sensed pairing condition," and not sensed pairing condition" are used to reflect a connection status between counterparts of a pair of IoT devices. The connection status does not necessarily reflect a communicative connection in its traditional sense, particularly since the connection may be between an active IoT device and a passive IoT device (i.e. a passive IoT device does not include a communication interface). Thus, if an active IoT device detects the shape or color of a passive IoT device, the detection of the passive IoT device by the active IoT device can be determined as a "sensed" pairing condition. Therefore, a sensed pairing condition represents a detection/communicative connection between a pair of active IoT devices, or an active IoT device and a passive IoT device. In contrast, a "not sensed" pairing condition represents the lack of a detection/communication connection between a pair of active IoT devices, or an active IoT device and a passive IoT device.

As used herein, an "IoT device" is a device that includes sensing and/or control functionality as well as a wireless network transceiver radio or other interfaces that allow the IoT device to communicate with a wide area network and with one or more other devices.

Further, the term "techniques," as used herein, may refer to system(s), method(s), computer-readable instruction(s), module(s), algorithms, hardware logic, and/or operation(s) as permitted by the context described above and through the document.

Figure 1B:
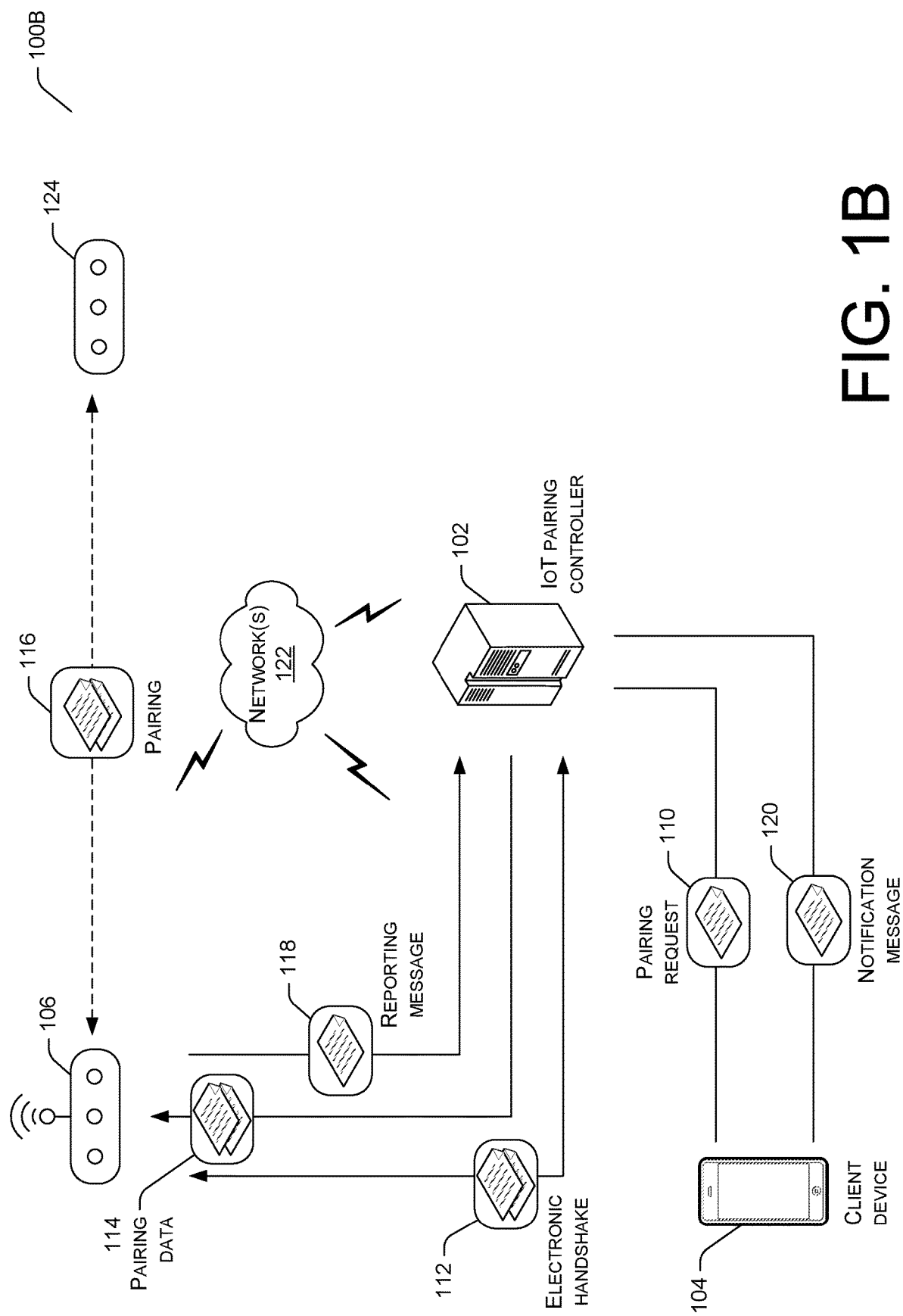

FIGS. 1A and 1B illustrate a computing environment that facilitates an operation of an IoT pairing controller. FIG. 1A illustrates a wireless communication system 100A whereby an IoT pairing controller 102 interacts with a pair of active IoT devices. FIG. 1B illustrates a wireless communication system 100B whereby the IoT pairing controller 102 interacts with at least one passive IoT device.

Referring to FIG. 1A, the wireless communication system 100A may include the IoT pairing controller 102 that is configured to interact with a client device 104 and IoT devices 106 and 108. In this example, IoT devices 106 and 108 are active IoT devices, meaning that IoT devices 106 and 108 can be coupled to or otherwise made part of the wireless communications system 100A.

In the illustrated example, the client device 104 may transmit a pairing request 110 to the IoT pairing controller 102. The pairing request may include various parameters that control a connection between a pair of IoT devices, such as a pairing signal type, client-defined statements that provide real-world meaning to a pairing condition of the IoT devices 106 and 108, the pairing condition being one of a "sensed" pairing condition or "not sensed" pairing condition. In some examples, the pairing request may also include a connection interval for which IoT devices are to maintain a continuous connection (i.e. "sensed" pairing condition). The length of time of a connection interval may save electrical power for implementations where the IoT devices are battery operated. Shorter intervals may prioritize the continuity of maintaining the connection. The pairing request may also include a reporting schedule that specifies a periodic reporting interval for which at least one active IoT device of a pair of IoT devices, reports a status of a pairing condition.

In response to receiving the pairing request 110, the IoT pairing controller 102 may initiate a reporting message 118 with the IoT devices 106 and 108. In this instance, the IoT pairing controller 102 may transmit a signal to any IoT devices within a predetermined range (i.e. the predetermined range being governed by the communication interface of the IoT pairing controller 102). Provided the IoT devices 106 and 108 are located within a predetermined range, the IoT pairing controller 102 may receive a response to the reporting message 118 that includes an IoT device identifier along with any other attributes associated with the corresponding IoT devices. By way of example, corresponding attributes may include one or more pairing signal types that are available via the IoT device.

Moreover, the IoT pairing controller 102 may generate pairing data 114 that is configured to automatically establish a connection (i.e. pairing/sensing 116) between the IoT devices 106 and 108. The pairing data 114 may include an IoT device identifier for each IoT device, and the one or more pairing signal types that were specified within the pairing request. The one or more pairing signals may include light, sound, infra-red, heat, Radio Frequency (RF) signal, or Bluetooth. Further, in cases where more than one pairing signal type is specified, each pairing signal type may include a priority parameter with which its application is governed. The priority parameter may prioritize one pairing signal type over another in sequential order. The pairing controller may also adjust the signal strength used by the IoT devices, based on the signal strength it takes to detect the device.

Further, the pairing data 114 may also specify the connection interval which corresponds to a time interval for which the IoT devices are to maintain a connection (i.e. "sensed" pairing condition). The pairing data 114 may also include a reporting schedule that specifies a periodic reporting interval for which an active IoT device is to report a status of a pairing condition, namely a "sensed" pairing condition or a "not sensed" pairing condition.

The IoT pairing controller 102 may transmit the pairing data to IoT devices with a communication interface. In the illustrated example of FIG. 1A, IoT devices 106 and 108 are both active IoT devices, meaning both have communication interfaces and can be coupled to or otherwise made part of the wireless communications system 100A. In this instance, the IoT pairing controller can transmit the pairing data 114 to IoT devices 106 and 108. In various examples, the IoT pairing controller 102 may transmit an additional instance of pairing data 114 to the IoT devices 106 and 108 for purposes such as initiating a change in pairing signal type, which is described in more detail with reference to FIGS. 7 and 8.

Moreover, at least one of IoT devices 106 or 108 may transmit a reporting message 118 to the IoT pairing controller 102. The reporting message may include an indication of the pairing condition between IoT devices 106 and 108.

In response to receiving the reporting message 118, the IoT pairing controller 102 may generate a notification message 120 for delivery to the client device 104 associated with an end-user. The notification message 120 may include an indication of the pairing condition, along with a corresponding client-defined statement that is associated with the pairing condition.

The client device 104, as described herein, may be a mobile handset, a smartphone, a tablet computer, a personal digital assistant (PDA), a smartwatch, or any other electronic communication or Internet of Things (IoT) device that is capable of executing applications.

The IoT devices 106 and 108 may be electronic devices that include sensing and/or controlling functionality as well as a wireless network transceiver radio or other interfaces that allow the IoT devices 106 and 108 to communicate with a wide area network and with one or more other devices. The wireless network transceiver radio or interface may include a Wi-Fi transceiver radio or interface, an Ultra-Wideband (UWB) transceiver radio or interface, a Bluetooth transceiver radio or interface.

The IoT pairing controller 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices via one or more network(s) 122.

Moreover, the one or more network(s) 122 may include public networks such as the Internet, private networks such as an institutional and/or personal intranet, or some combination of private and public networks. The one or more network(s) can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

FIG. 1B illustrates a high-level architecture of another wireless communications system 100B that includes a plurality of IoT devices. In general, the wireless communication system 100B shown in FIG. 1B may include various components that are the same and/or substantially similar to the wireless communication system 100A shown in FIG. 1A, which was described in greater detail above (e.g. various active IoT devices that are configurable to communicate with the IoT pairing controller over an air interface and/or a direct wired connection). As such, for brevity and ease of description, various details relating to certain components in the wireless communications system 100B shown in FIG. 1B may be omitted herein to the extent that the same or similar details have been provided above in relation to the wireless communications system 100A illustrated in FIG. 1A.

Referring to FIG. 1B, the wireless communications system 100B may include a passive IoT device 124 (in contrast to IoT devices 106 and 108 that are active IoT devices) that can be coupled to or otherwise made part of the wireless communications system 100A. In general, the passive IoT device 124 may include barcoded devices, Bluetooth devices, radio frequency (RF) devices, RFID tagged devices, infrared (IR) devices, Near-Field Communication (NFC) devices or any other suitable device that can provide its identifier and attributes to another device when queried over a short-range interface. Active IoT devices may detect, store, communicate, act on, and/or the like.

For example, the passive IoT device 124 may correspond to a coffee cup and a container of orange juice that each have an RFID tag or barcode. A cabinet IoT device (e.g. active IoT device) may have an appropriate scanner or reader that can read the RFID tag or barcode to detect when the coffee cup has been added (i.e. "sensed" pairing condition) or removed (i.e. "not sensed" pairing condition). In response to the cabinet IoT device detecting the removal of the coffee cup, the IoT pairing controller may receive one or more signals that relate to the activities detected at the cabinet IoT device. The IoT pairing controller may generate a notification message 120 based on the "sensed" pairing condition or the "not sensed" pairing condition. In one example, the IoT pairing controller may identify a client-defined statement that an end-user associated with the "sensed" pairing condition and the "not sensed" pairing condition. In this example, the client-defined statement associated with the "sensed" pairing condition may be "coffee cup in the cabinet," and the client-defined statement associated with the "not sensed" pairing condition may be "coffee cup out of the cabinet." The IoT pairing controller may then transmit the appropriate client-defined statement to the client device, based at least in part on the determined "sensed" or "not sensed" pairing condition.

Although the foregoing describes the passive IoT device 124 as having some form of RFID tag or barcode communication interface, the passive IoT device 124 may include one or more devices or other physical objects that do not have such communication capabilities. For example, certain IoT devices may have an appropriate scanner or reader mechanisms that can detect shapes, sizes, colors, and/or other observable features associated with the passive IoT device 124 to identify the passive IoT device 124. In this manner, any suitable physical object may communicate its identity and attributes and become part of the wireless communications system 100B and be observed, monitored, controlled, or otherwise managed with the IoT pairing controller 102.

Figure 2:
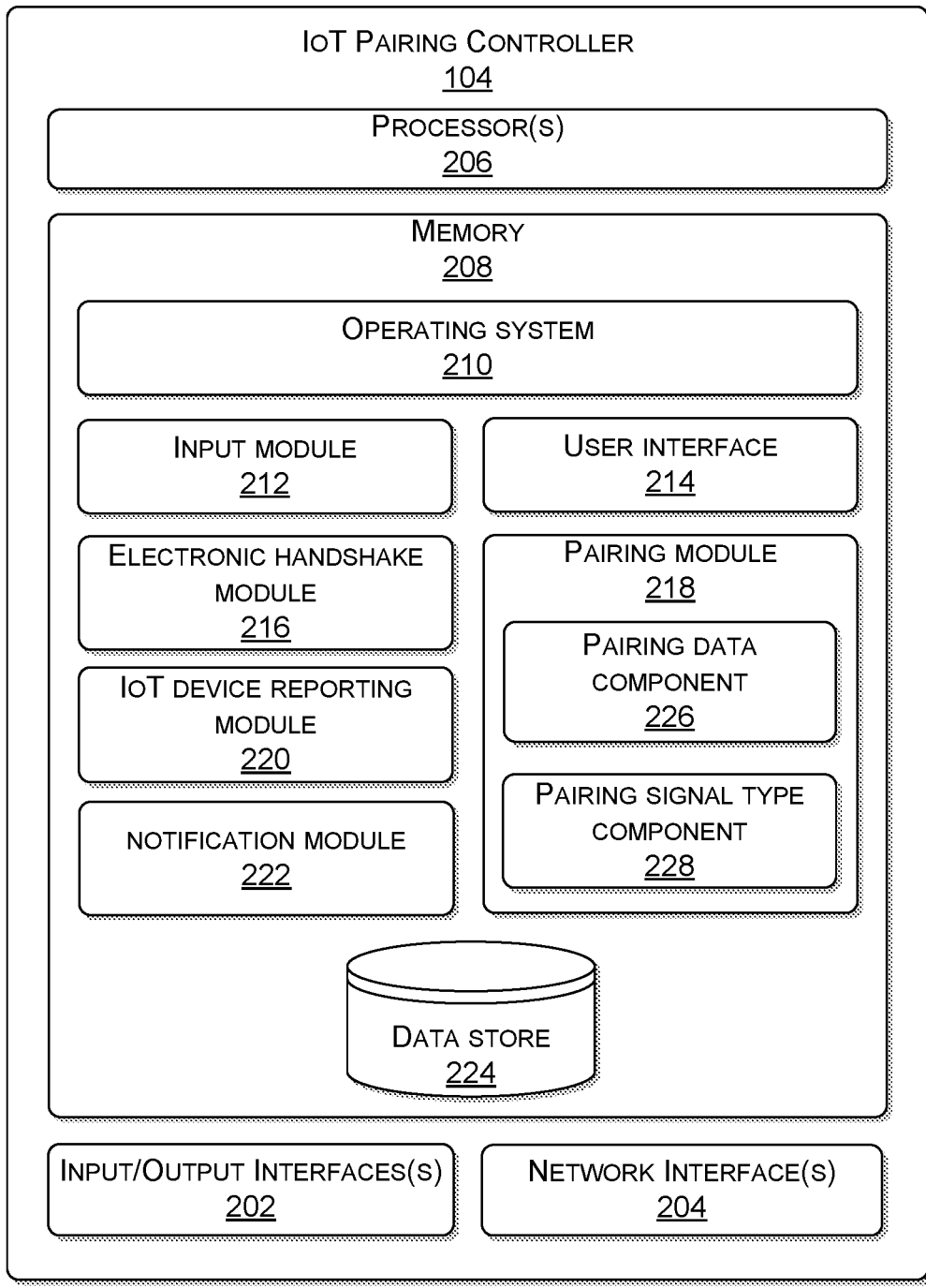
FIG. 2 illustrates a block diagram of various components of the IoT pairing controller.

FIG. 2 illustrates a block diagram of various components of the IoT pairing controller 102. In various examples, the IoT pairing controller can facilitate an end-user to configure a pair of IoT devices to toggle between different pairing signal types (i.e. light, sound, infra-red, heat, Radio Frequency (RF) signal, and/or so forth), and in some cases, automatically toggle between different pairing signal types based on detected ambient conditions.

The IoT pairing controller 102 may include input/output interface(s) 202. The input/output interface(s) 202 may include any type of output interface known in the art, such as a display (e.g. a liquid crystal display), speakers, a vibrating mechanism, or a tactile feedback mechanism. Input/output interface(s) 202 also include ports for one or more peripheral devices, such as headphones, peripheral speakers, or a peripheral display. Further, the input/output interface(s) 202 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the IoT pairing controller 102 may include network interface(s) 204. The network interface(s) 204 may include any sort of transceiver known in the art. For example, the network interface(s) 204 may include a radio transceiver that performs the function of transmitting and receiving radio frequency communications via an antenna. In addition, the network interface(s) 204 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 204 may include wired communication components, such as an Ethernet port or a Universal Serial Bus (USB).

Further, the IoT pairing controller 102 may include one or more processor(s) 206 that are operably connected to memory 208. In at least one example, the one or more processor(s) 206 may be a central processing unit(s) (CPU), graphics processing unit(s) (GPU), or both a CPU and GPU or any other sort of processing unit(s). Each of the one or more processor(s) 206 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 206 may also be responsible for executing all computer applications stored in the memory, which can be associated with common types of volatile (RAM) and/or non-volatile (ROM) memory.

In some examples, memory 208 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 208 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 208 may include an operating system 210, an input module 212, a user interface 214, an electronic handshake module 216, a pairing module 218, an IoT device reporting module 220, a notification module 222, and a data store 224. The operating system 312 may be any operating system capable of managing computer hardware and software resources. The operating system 210 may include an interface layer that enables applications to interface with the input/output interface(s) 202 and the network interface(s) 204.

The input module 212 may be configured to receive a pairing request from client devices, such as client device 104. The pairing request may include various parameters that control a connection between a pair of IoT devices. Further, the input module 212 may be further configured to receive any one of the example inputs described above with reference to the user interface 214.

The user interface 214 may enable a user, such as an operator of the IoT pairing controller 102 to provide inputs and receive outputs from the IoT pairing controller 102. An example input may include a reporting schedule that specifies a periodic reporting interval for which active IoT devices of a pair of IoT devices are to report the status of a pairing condition. Another example input may include a connection interval which corresponds to a time interval for which the IoT devices are to maintain a connection (i.e. "sensed" pairing condition). Other example input may include predetermined thresholds that relate to various ambient conditions or device identifiers associated with passive IoT devices.

Example output may include reporting messages that indicate a pairing condition of a pair of IoT devices, namely being one of a "sensed" pairing condition or a "not sensed" pairing condition. Another example output may include a notification message intended for a client device. The notification message may include an indication of a pairing condition along with a client-defined statement that provides real-world meaning to the pairing condition.

The electronic handshake module 216 may be configured to execute instructions that initiate the electronic handshake messages to any active IoT devices within a predetermined range (i.e. the predetermined range being governed by the communication interface of the IoT pairing controller 102). The electronic handshake module 216 may also execute instructions to handle the receipt of the electronic handshake responses received.

The pairing module 218 may include a pairing data component 226 and a pairing signal type component 228. The pairing data component 226 may be configured to generate pairing data that automatically establishes a connection between a pair of IoT devices. The pairing data may include an IoT device identifier for each IoT device, and the one or more pairing signal types specified within the pairing request. Further, in cases where more than one pairing signal type is specified, each pairing signal type may include a priority parameter with which its application is governed. The priority parameter may prioritize one pairing signal type over another in sequential order. The sequential order may be specified within the pairing request.

The pairing data may specify a connection interval for which the IoT devices are to maintain a connection (i.e. "sensed" pairing condition). The connection interval may be specified within the pairing request. Alternatively, the connection interval may be set by an operator of the IoT pairing controller, via the user interface 214. The pairing data may also include a reporting schedule that sets out when an IoT device is to report to the IoT pairing controller.

The pairing signal type component 228 may be configured to identify an alternate pairing signal type that is to be used to establish a connection between a pair of IoT devices. The selection of the alternate pairing signal type may be based on a listing associated with the pairing request, along with the capabilities of the IoT devices, themselves. The pairing signal type component 228 may generate an additional pairing data packet that includes the alternate pairing signal type.

In an example, the pairing signal type component 228 may identify an alternate pairing signal type in response to the IoT device reporting module 220 receiving a reporting message that indicates that a pair of IoT devices is unpaired (i.e. "not sensed" pairing condition). In another example, the pairing signal type component 228 may identify an alternate pairing signal type in response to receiving an indication, from one of the IoT devices, that a measurement of an ambient condition, which correlates with a medium of the pairing signal type, is greater than a predetermined threshold. In other words, the ambient conditions at one of the IoT devices may interfere with the transmission of the current pairing signal between the IoT devices.

The IoT device reporting module 220 may be configured to receive a reporting message from an IoT device. The reporting message may indicate a pairing condition of the IoT devices, namely being one of a "sensed" pairing condition or a "not sensed" pairing condition. In one example, the IoT device reporting module 220 may be further configured to pull-request a reporting message from an IoT device. Alternatively, the reporting messages are pushed from the IoT devices, based on a reporting schedule that is part of the pairing data sent to each IoT device.

The notification module 222 may be configured to generate a notification message for delivery to a client device 104. The notification message may include an indication of the pairing condition, along with a corresponding client-defined statement that is associated with the pairing condition. The client-defined statements are intended to provide real-world meaning to the pairing condition of IoT devices.

The data store 224 may be configured to store data related to the IoT devices, the client devices that interact with the IoT pairing controller, along with historical instances of electronic handshakes, corresponding handshake responses received, and reporting messages received, as they relate to individual IoT devices.

Figure 3:
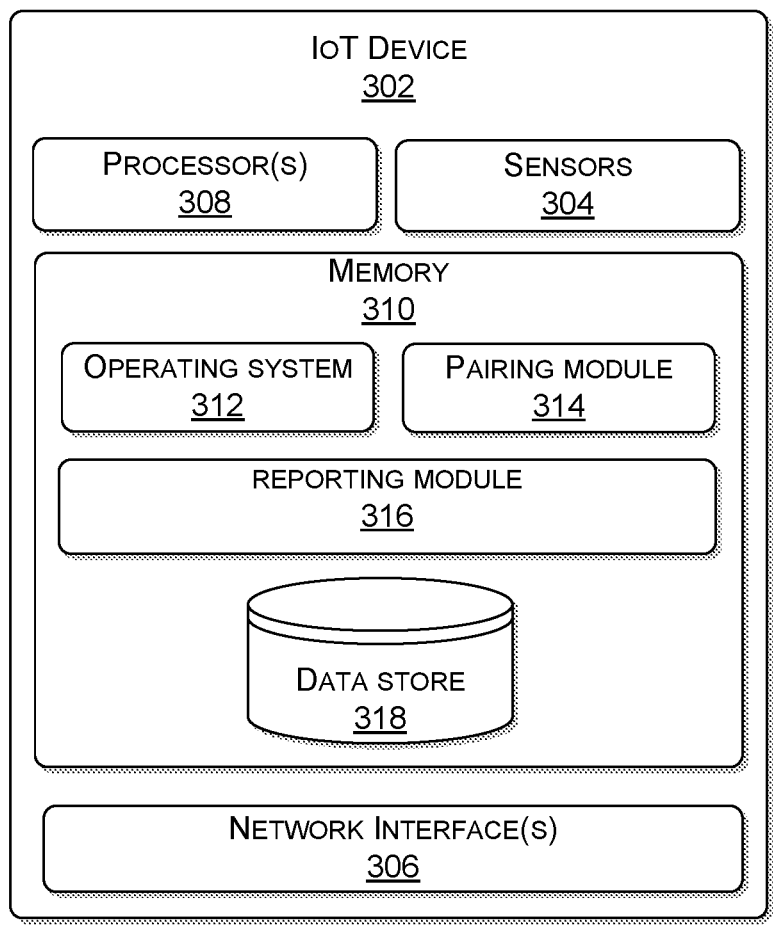
FIG. 3 illustrates a block diagram of various components of an IoT device.

FIG. 3 illustrates a block diagram of various components of an IoT device 302. The IoT device 302 may correspond to one of IoT device 106 or 108. IoT device 302 corresponds to an active IoT device. An active IoT device is configured with a communication interface so that it can be coupled to or otherwise made part of the wireless communications system 100A.

In the illustrated example, the IoT device 302 may include sensor(s) 304. The sensor(s) 304 may be used to receive and/or emit a pairing signal that is part of establishing a connection with another IoT device. The sensor(s) may include an optical transducer to emit and detect a particular wavelength of light; an audio transducer to emit an audio signal of a particular frequency and to the receive the same; a heat sensor to detect a thermal profile; and one more Radio Frequency antennae (i.e. Bluetooth, Wi-Fi, and/or so forth).

Further, the IoT device 302 may include network interface(s) 306. The network interface(s) 306 may include any sort of transceiver known in the art. For example, the network interface(s) 306 may include a radio transceiver that performs the function of transmitting and receiving radio frequency communications via an antenna. In addition, the network interface(s) 306 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 306 may include wired communication components, such as an Ethernet port or a Universal Serial Bus (USB).

Further, the IoT device 302 may include one or more processor(s) 308 that are operably connected to memory 310. The one or more processor(s) 308 may be similar to the one or more processor(s) 206 and the memory 310 may be similar to the memory 208. In the illustrated example, the memory 310 may include an operating system 312, a pairing module 314, a reporting module 316, and a data store 318. The operating system 312 may be similar to the operating system 210. The pairing module 314 may be configured to receive pairing data from the IoT pairing controller 102, and further use the pairing data to establish a connection with a counterpart IoT device.

The reporting module 316 may be configured to transmit a reporting message to the IoT pairing controller 102 based on a reporting schedule, or in response to a change in a pairing condition. A reporting schedule may be set out in the pairing data received by the pairing module 314. A change in the pairing condition may be a change from a "sensed" pairing condition to a "not sensed" pairing condition or vice versa.

The data store 318 may be configured to store historical instances of electronic handshakes, corresponding responses, and reporting messages sent to the IoT pairing controller.

FIGS. 4 through 7 present processes 400 through 700 that relate to operations of the IoT Pairing Controller. Each of processes 400 through 700 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400 through 700 are described with reference to the wireless communication systems of FIGS. 1A and 1B.

Figure 4:
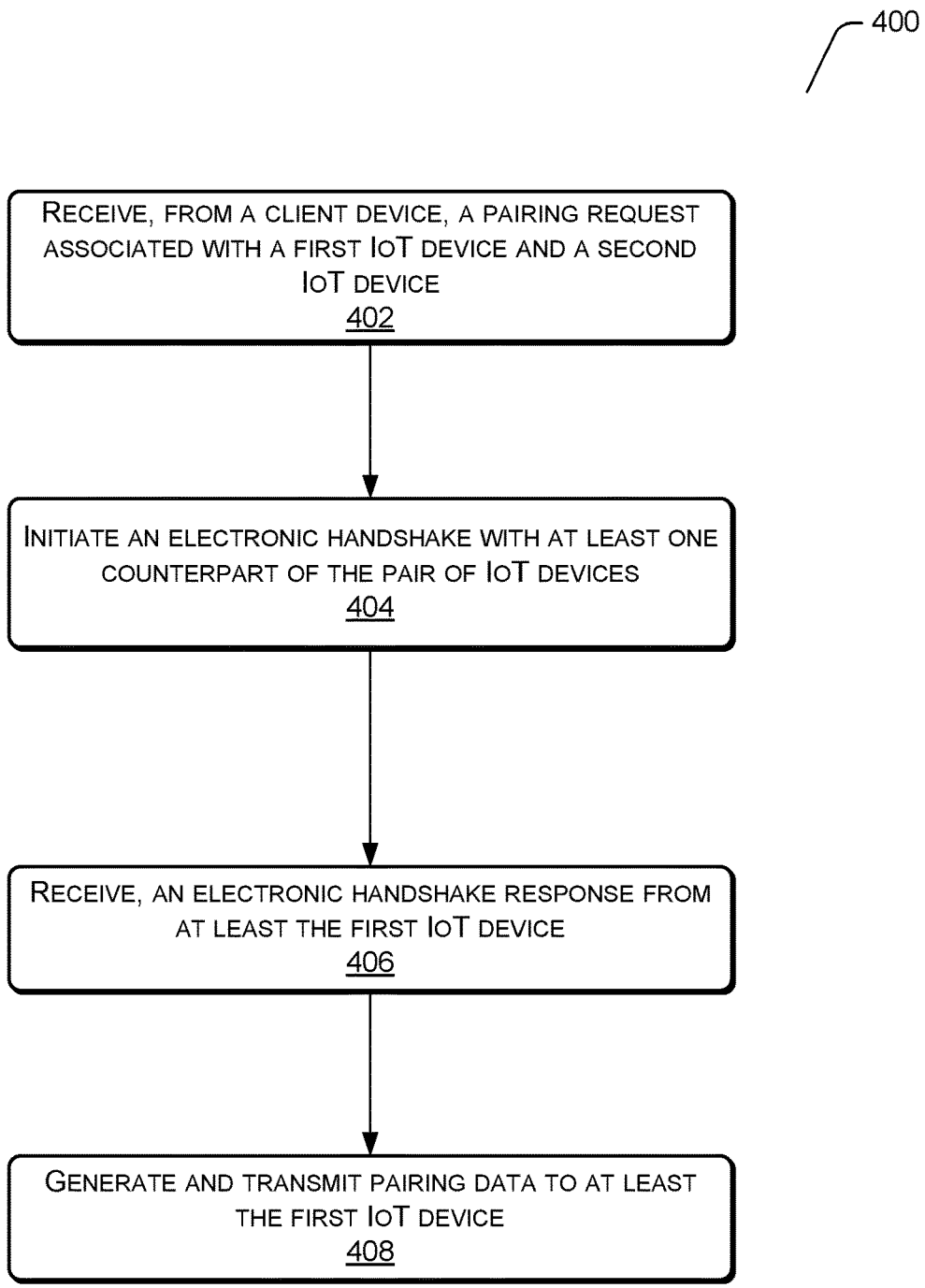
FIG. 4 illustrates a process for generating pairing data to establish a connection between a pair of IoT devices.

FIG. 4 illustrates a process for generating pairing data to establish a connection between a pair of IoT devices. In one example, the pair of IoT devices may include an active and passive IoT device, whereby the pairing data permits the active IoT device to detect the passive IoT devices. Alternatively, the pair of IoT devices may active IoT devices.

At 402, the IoT pairing controller may receive from a client device, a pairing request to a pair a first IoT device and a second IoT device. The pairing request may include various parameters, such as a pairing signal type. The pairing request may include a selection of multiple pairing signal types. Doing so permits the IoT devices to establish different types of connections under circumstances whereby environmental conditions dictate a necessity. Pairing signal types may include a light signal, a thermal signal, a radio frequency signal, a sound signal, and/or so forth. Depending on the intended proximity of each counterpart of the pair of IoT devices to one another, the pairing signal type may also include a Bluetooth signal or a Wi-Fi signal.

In an example where the pair of IoT devices include a passive IoT device, the pairing request may also include a passive IoT device identifier (i.e. barcode, RFID tag, and/or so forth). In this way, the counterpart active IoT device may then use the passive IoT device identifier to detect the presence of the passive IoT device.

At 404, the IoT pairing controller may initiate an electronic handshake with at least one counterpart of the pair of IoT devices. The electronic handshake is intended to establish a connection between an in-range active IoT device and the IoT pairing controller. The IoT pairing controller may initiate the electronic handshake via a cellular data communication, provided the active IoT device includes a cellular data communication interface to facilitate the cellular data communication. In an example, cellular data coverage is dependent on the cellular data communication interface of the active IoT device. An active IoT device with an ultra-short-range communication interface may have a range of fewer than ten meters. In an alternate embodiment, the range may be less than five meters. The cellular data may include cellular data protocols commonly referred to as 2G, 3G, 4G, Long-Term Evolution (LTE), and 5G-New Radio (5G-NR).

The IoT pairing controller may also initiate the electronic handshake via a common Wireless local area network (LAN), such as a Wi-Fi or Bluetooth.

It is noteworthy that in cases whereby the IoT pairing controller is establishing a connection between a pair of active IoT devices, the IoT pairing controller initiates the electronic handshake with each counterpart of the pair.

At 406, the IoT pairing controller may receive an electronic handshake response from at least the first IoT device. In an embodiment where the pair of IoT devices is both active IoT devices, the IoT pairing controller may receive an electronic handshake response from each counterpart of the pair of IoT devices. The electronic handshake response may include an IoT device identifier that uniquely identifies the IoT device to the IoT pairing controller.

At 408, the IoT pairing controller may generate pairing data that is configured to automatically establish a connection between the first IoT device and the second IoT device. The pairing data may include an IoT device identifier for each IoT device, and the one or more pairing signal types that were specified within the pairing request. Further, in cases where more than one pairing signal type was specified, each pairing signal type will include a priority parameter with which its application is governed. The priority parameter may prioritize one pairing signal type over another in sequential order. Alternatively, or additionally, the priority parameter may account for ambient conditions that may impact one or both counterparts of the pair of IoT devices.

Further, the pairing data may also specify a connection interval for which the IoT devices are to maintain a connection (i.e. "sensed" pairing condition). The connection interval may be specified within the pairing request received from the client device. Alternatively, the connection interval may be set by an operator of the IoT pairing controller. In one example, the connection interval may specify that the pair of IoT devices establishes a continuous connection or a connection based on a periodic schedule. The periodic schedule may include initiating a connection between IoT devices once every five minutes, once every minute, or once every 15 seconds. Any connection interval is possible. Longer intervals may save electrical power for implementations where the IoT devices are battery operated. Shorter intervals may prioritize the continuity of maintaining the connection.

Moreover, the pairing data may also include a reporting schedule that sets out when an IoT device is to report to the IoT pairing controller. The scope of the reporting schedule and its implementation is discussed in more detail with reference to FIG. 5.

Figure 5:
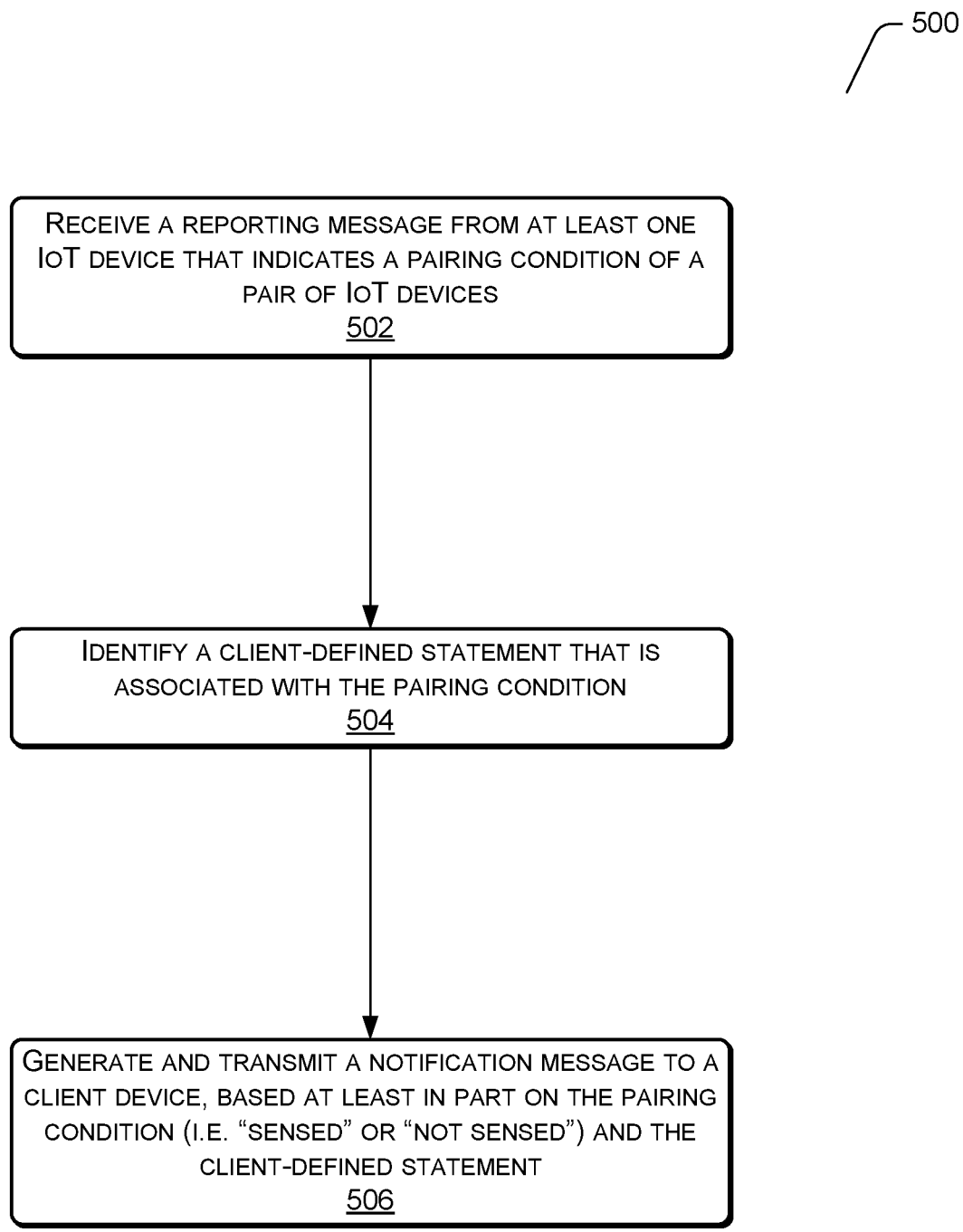
FIG. 5 illustrates a process for generating a notification message for a client device based on a pairing condition of IoT devices.

FIG. 5 illustrates a process 500 for generating a notification message for a client device based on a pairing condition of IoT devices. The pairing condition of the IoT devices may be a "sensed" pairing condition or a "not sensed" pairing condition. A "sensed" pairing condition reflects an establish connection between the counterparts of a pair of IoT devices. In contrast, a "not sensed" pairing condition reflects the lack of a connection between the counterparts of a pair of IoT devices.

At 502, the IoT pairing controller may receive a reporting message from at least one IoT device (i.e. an active IoT device) that indicates a pairing condition of the pair of IoT devices. The pairing condition may be one of a "sensed" pairing condition or a "not sensed" pairing condition. In one example, the IoT device may automatically transmit a reporting message to the IoT pairing controller in response to a change in the pairing condition. A change in the pairing condition may be a change from a "sensed" pairing condition to a "not sensed" pairing condition or vice versa.

Moreover, an active IoT device may transmit a reporting message to the IoT pairing controller based at least in part on a reporting schedule set out in the pairing data that was initially received from the IoT pairing controller. The reporting schedule may specify a periodic reporting interval for which an active IoT device is to report a status of a pairing condition, irrespective of whether a change has occurred from a "sensed" pairing condition to a "not sensed" pairing condition or vice versa. The reporting interval may be once every five minutes, once every minute, or once every 15 seconds. Any reporting interval is possible. In various examples, the reporting schedule may be set by an operator of the IoT pairing controller or included within the pairing request from an end-user.

Additionally, or alternatively, the IoT pairing controller may pull-request a reporting message from an active IoT device, rather than relying on the active IoT device to transmit the reporting message.

At 504, the IoT pairing controller may identify a client-defined statement that is associated with the pairing condition. The client-defined statements are provided to the IoT pairing controller by an end-user as part of the pairing request and are intended to provide real-world meaning to pairing condition. For example, a pair of IoT devices may be configured to monitor movements of a patient in and out of a hospital bed. When the patient is in the hospital bed, the pair of IoT devices may be sensed (i.e. "sensed" pairing condition). In this scenario, the end-user may associate a client-defined statement, namely "patient in bed," with the "not sensed" pairing condition. Alternatively, when the patient is not in the hospital bed, the pair of IoT device may be unpaired (i.e. "not sensed" pairing condition). In this scenario, the end-user may associate another client-defined statement, namely, "patient is out," with the "not sensed" pairing condition.

At 506, the IoT pairing controller may generate a notification message for delivery to the client device (i.e. end-user), or other delegated user based at least in part on the pairing condition (i.e. "sensed" or "not sensed pairing condition) of the IoT devices and the appropriate client-defined statement.

Figure 6:
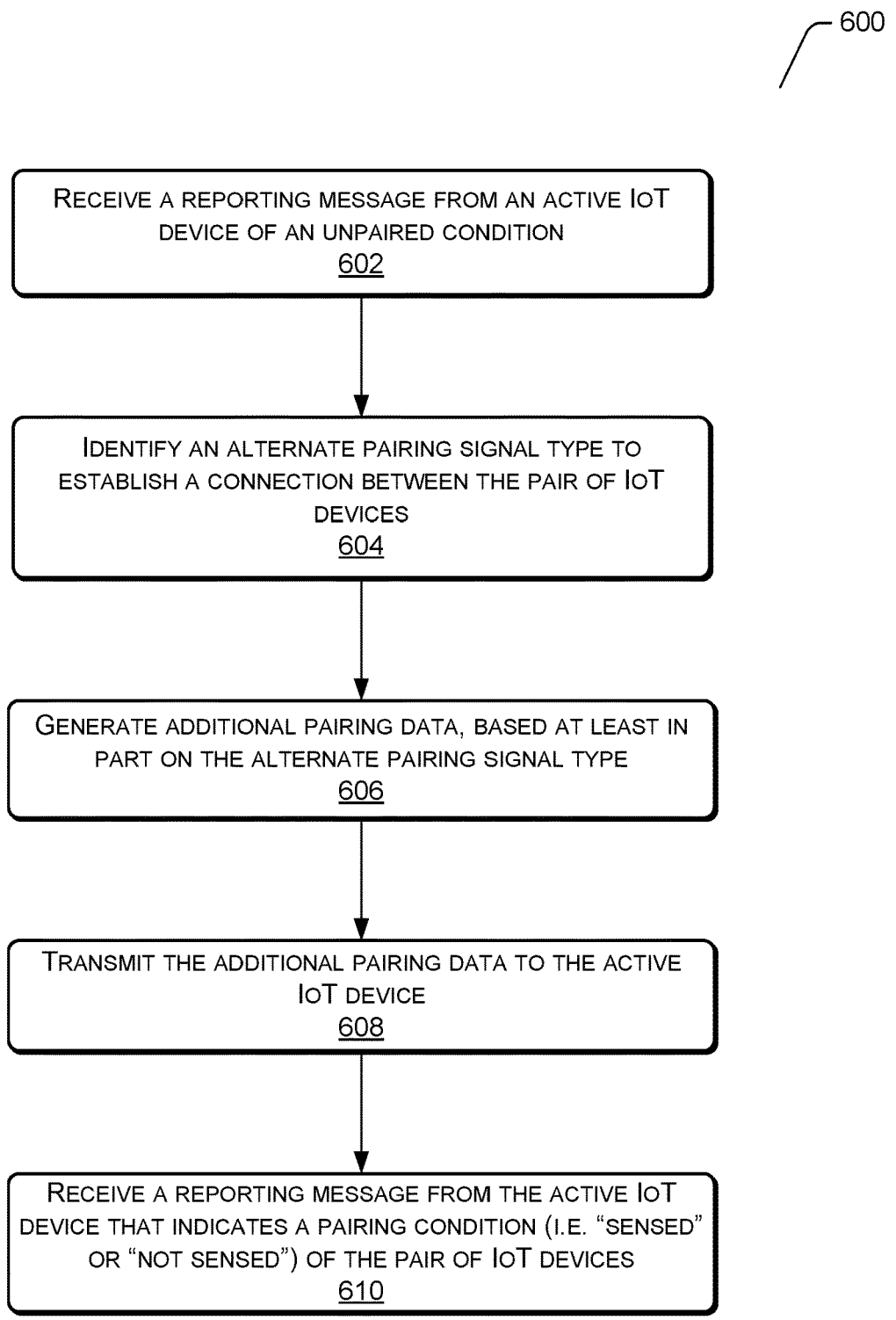
FIG. 6 illustrates a process to change a pairing signal type used to establish a connection between IoT devices.

FIG. 6 illustrates a process 600 to change a pairing signal type used to establish a connection between IoT devices. In various examples, a pair of IoT devices may be configured to connect using one or more pairing signal types, such as light, sound, infra-red, heat, Radio Frequency (RF) signal, Bluetooth, and/or so forth. Further, establishing a successful connection may be dependent on many factors, such as ambient conditions associated with each IoT device and physical objects that may be obstructing a direct line-of-sight between the IoT devices.

Therefore, in response to receiving an indication that the pairing condition of a pair of IoT device is unpaired (i.e. "not sensed" pairing condition), the IoT pairing controller may generate additional pairing data that includes an alternate pairing signal type, for the purpose of determining whether the counterparts of the pair remain proximate to one another.

At 602, the IoT pairing controller may receive a reporting message from an active IoT device that states that the active IoT device and its counterpart are unpaired (i.e. "not sensed" pairing condition). The reporting message may further include an identifier associated with each counterpart of the pair of IoT device and a time stamp representing when the "not sensed" pairing condition was reported or occurred.

At 604, the IoT pairing controller may identify an alternate pairing signal type that may be used to establish a connection between the pair of IoT devices, based at least in part on pairing request data. In one example, consider an end-user employing a pair of IoT devices to monitor the position of a particular object, such as a safe box. A passive IoT device may be fixed to the safe box and an active IoT device may be positioned elsewhere in direct line-of-sight of the safe box. If the direct line-of-sight is obstructed by a different object, such as placement of a clothing article, or movement of an individual, the pairing condition of the pair of IoT devices will be affected. In this circumstance, the end-user may elect to choose an additional pairing signal type that can be used to establish a connection between the pair of IoT devices.

At 606, the IoT pairing controller may generate additional pairing data that is configured to automatically establish a connection between the pair of IoT devices using the additional pairing signal type. By way of example, the original pairing signal type may be an infra-red signal, and the additional pairing signal type may an RF signal, provided that the counterpart IoT device is configured to transmit/receive an RF signal.

At 608, the IoT pairing controller may transmit the additional pairing data to the active IoT device. If both counterparts of the pair of IoT devices are active IoT devices, the IoT pairing controller may transmit the additional pairing data to both counterparts.

At 610, the IoT pairing controller may receive a reporting message from the active IoT device that indicates a pairing condition (i.e. "sensed" or "not sensed pairing condition) of the pair of IoT devices. In the event that the pairing condition changed from a "not sensed" pairing condition to a "sensed" pairing condition, the IoT pairing controller may report the same to a client device in a notification message, as described earlier with reference to FIG. 6. The notification message may further indicate that the pairing signal type was changed to reestablish a connection between IoT devices. Alternatively, if the pairing condition remained unchanged, namely a "not sensed" pairing condition, the IoT pairing controller may report the same to the client device in the notification message.

Figure 7:
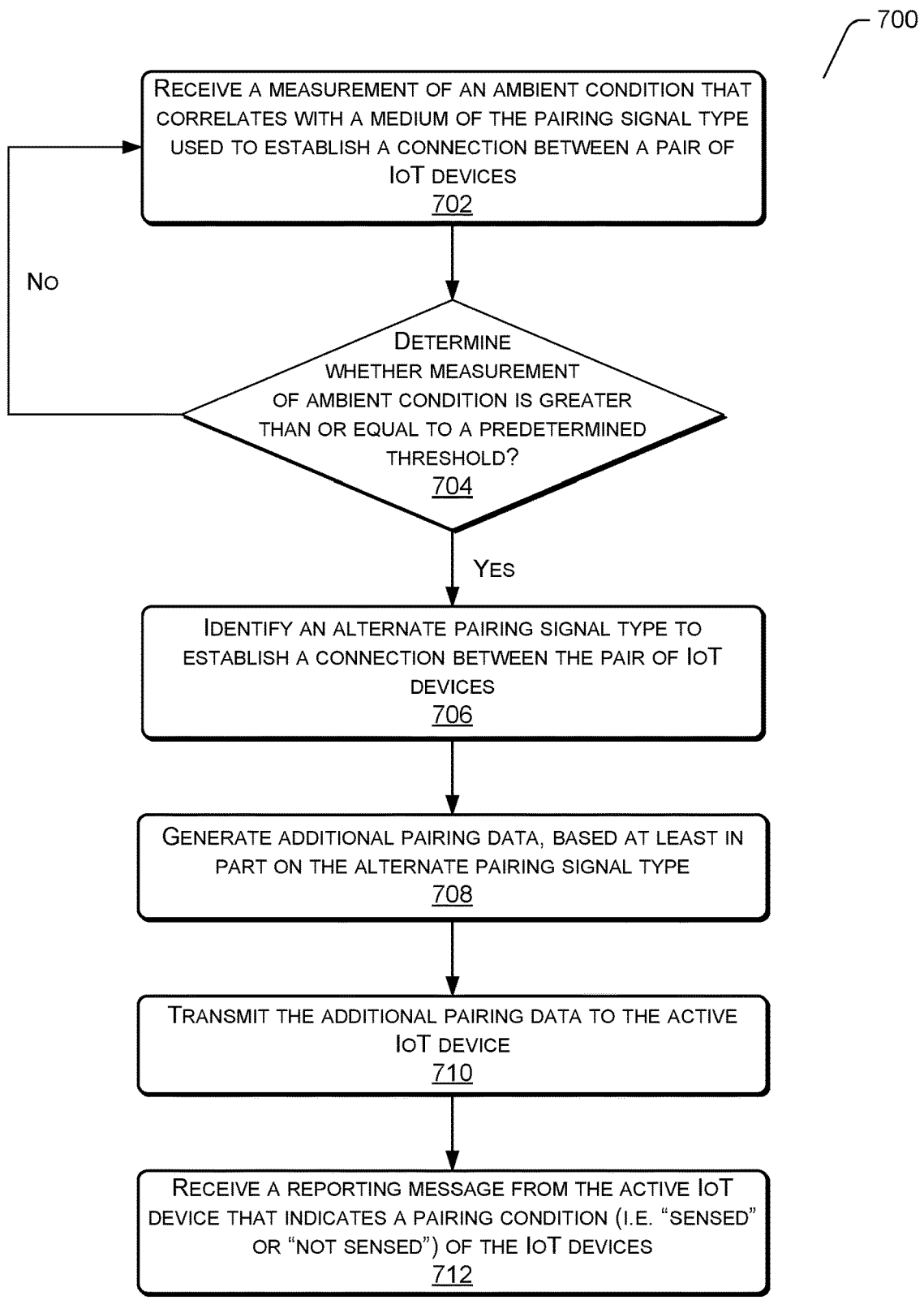
FIG. 7 illustrates a process to change a pairing signal used to establish a connection between IoT devices based at least in part on a change in ambient conditions.

FIG. 7 illustrates a process 700 to change a pairing signal used to establish a connection between IoT devices based at least in part on a change in ambient conditions. The ambient conditions may include an ambient noise, an ambient light intensity, an ambient temperature, or an ambient RF signal.

In one example, consider a pair of IoT devices configured to establish a connection using a sound signal of a particular frequency. If the ambient noise surrounding the IoT devices interferes with the select frequency of the sound wave, then the pairing condition of the IoT device may be misreported.

At 702, the IoT pairing controller may receive a measurement of an ambient condition that correlates with a medium of the pairing signal type used to establish a connection between a pair of IoT devices. Continuing with the above example, if the pairing signal type used is a sound signal, then the ambient condition of interest is ambient noise. Similarly, if the pairing signal type is a light signal, then the ambient condition of interest is ambient light intensity.

At 704, the IoT pairing controller may determine whether the measurement of the ambient condition is greater than or equal to a predetermined threshold. The predetermined threshold is intended to identify a point in which ambient conditions may interfere with the transmission of a pairing signal between IoT devices. The predetermined threshold may be set by an operator of the IoT pairing controller, an end-user via a client device, or both.

At 706, the IoT pairing controller may determine that the measurement of the ambient condition is greater than or equal to the predetermined threshold. In doing so, the IoT pairing controller may identify an alternate pairing signal type that may be used to establish a connection between the pair of IoT devices, based at least in part on pairing request data.

Alternatively, the IoT pairing controller may determine that the measurement of the ambient condition is less than the predetermined threshold. In this instance, process 700 may return to step 702 and continue to receive measurements of ambient conditions that surround the IoT devices.

At 708, the IoT pairing controller may generate additional pairing data that is configured to automatically establish a connection between the pair of IoT devices using the additional pairing signal type. By way of example, the original pairing signal type may be a sound signal, and the additional pairing signal type may a light signal, provided that the counterpart IoT device is configured to transmit/receive a light signal.

At 710, the IoT pairing controller may transmit the additional pairing data to an active IoT device of the pair of IoT devices. If both counterparts of the pair of IoT devices are active IoT devices, the IoT pairing controller may transmit the additional pairing data to both counterparts.

At 712, the IoT pairing controller may receive a reporting message from the active IoT device that indicates a pairing condition (i.e. "sensed" or "not sensed pairing condition) of the pair of IoT devices. In the event that the pairing condition changed from a "not sensed" pairing condition to a "sensed" pairing condition, the IoT pairing controller may report the same to a client device in a notification message, as described earlier with reference to FIG. 5. The notification message may further indicate that the pairing signal type was changed due to ambient conditions surrounding the pair of IoT devices. Alternatively, if the pairing condition remained changed, namely a "not sensed" pairing condition, the IoT pairing controller may report the same to the client device in the notification message.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:
1. A system comprising:
one or more processors;
memory coupled to the one or more processors, the memory including one or more modules is executable by the one or more processors to:
receive, from a client device, a pairing request associated with a first Internet of Things (IoT) device and a second IoT device, the pairing request further including a pairing signal type of a plurality of pairing signal types that is to be used to pair the first IoT device and the second IoT device;
initiate an electronic handshake with the first IoT device and the second IoT device;
receive, from at least the first IoT device, an electronic handshake response that includes a first IoT device identifier;
generate pairing data that is configured to automatically establish a connection between the first IoT device and the second IoT device, the pairing data including the first IoT device identifier, a second IoT device identifier associated with the second IoT device, and the pairing signal type;
transmit the pairing data to at least the first IoT device;
receive, from at least the first IoT device, a reporting message that indicates a pairing condition associated with the first IoT device and the second IoT device; and
determine whether the pairing condition associated with the first IoT device and the second IoT device is a "sensed" pairing condition or a "not sensed" pairing condition, based at least in part on the reporting message; and
generate a notification message for delivery to the client device, a notification message indicating the pairing condition.

2. The system of claim 1, wherein the second IoT device is a passive IoT device, and wherein the one or more modules are further executable by the one or more processors to:
identify, from the pairing request, the second IoT device identifier.

3. The system of claim 1, wherein the one or more modules are further executable by the one or more processors to:
initiate an additional electronic handshake with the second IoT device;
receive, from the second IoT device, an additional electronic handshake response that includes the second IoT device identifier; and
transmit the pairing data to the second IoT device.

4. The system of claim 1, wherein the one or more modules are further executable by the one or more processors to:
in response to determining that the pairing condition is the "sensed" pairing condition, identify, from the pairing request, a client-defined statement for the "sensed" pairing condition, and
wherein the notification message includes the client-defined statement.

5. The system of claim 1, wherein the pairing signal type is a first pairing signal, and wherein the one or more modules are further executable by the one or more processors to:
in response to determining that the pairing condition is the "not sensed" pairing condition, identify, from the pairing request, an additional pairing signal type of the plurality of pairing signal types that is to be used to pair the first IoT device and the second IoT device, the additional pairing signal type being different from the pairing signal type;
generate additional pairing data that is configured to automatically establish the connection between the first IoT device identifier and the second IoT device identifier, and the additional pairing signal type, the additional pairing data including the first IoT device identifier, the second IoT device identifier, and the additional pairing signal type; and
transmit the additional pairing data to at least the first IoT device.

6. The system of claim 1, wherein the pairing signal type corresponds to one of a sound signal, a light signal, a thermal signal, or a radio frequency (RF) signal.

7. The system of claim 6, wherein the pairing signal type is a first pairing signal type, and wherein the one or more modules are further executable by the one or more processors to:
receive, from one of the first IoT device or the second IoT device, a measurement of an ambient condition that correlates with a medium of the pairing signal type;
determine whether the ambient condition exceeds a predetermined threshold;
in response to determining that the ambient condition exceeds the predetermined threshold, identify, from the pairing request, a second pairing signal type to pair the first IoT device and the second IoT device, the second pairing signal type being different from the first pairing signal type;
generate additional pairing data that includes the first IoT device identifier, the second IoT device identifier, and the second pairing signal type; and
transmit the additional pairing data to at least the first IoT device.

8. The system of claim 1, wherein the pairing request includes the second IoT device identifier associated with the second IoT device, and wherein the one or more modules are further executable by the one or more processors to:
determine that the second IoT device is a passive IoT device, based at least in part on the second IoT device identifier, and
wherein, the pairing signal type corresponding to one of a thermal signal to detect a temperature of the second IoT device, a Radio Frequency (RF) signal to detect an RFID tag or RFID barcode of the second IoT device, or an optical data signal to detect a shape or color of the second IoT device.

9. The system of claim 1, wherein the pairing condition is an initial pairing condition, and wherein the one or more modules are further executable by the one or more processors to:
initiate an additional electronic handshake with at least the first IoT device to verify a current pairing condition, the current pairing condition being one of the "sensed" pairing condition or the "not sensed" pairing condition;
receive, an additional reporting message in response to the additional electronic handshake, the additional reporting message including the first IoT device identifier, the second IoT device identifier, and the current pairing condition;
in response to the current pairing condition being different from the initial pairing condition, generate an additional notification message that indicates a change from the initial pairing condition to the current pairing condition; and
transmit the additional notification message to the client device.

10. A computer-implemented method, comprising:
under control of one or more processors:
receiving, from a client device, a pairing request associated with an active IoT device and a passive IoT device, the pairing request including a passive IoT device identifier for the passive IoT device, and a pairing signal type from a plurality of pairing signal types that is to be used by the active IoT device to detect the passive IoT device;

initiating an electronic handshake with the active IoT device;

receiving, from the active IoT device, an electronic handshake response that includes an active IoT device identifier;

generating pairing data that includes the active IoT device identifier, the passive IoT device identifier, and the pairing signal type;

transmitting the pairing data to the active IoT device;

receiving a reporting message from the active IoT device indicating a pairing condition associated with the active IoT device and the passive IoT device, the pairing condition being one of a "sensed" pairing condition or a "not sensed" pairing condition;

generating a notification message based at least in part on the pairing condition; and transmitting the notification message to the client device.

11. The computer-implemented method of claim 10, further comprising:

determining that the pairing condition is the "sensed" pairing condition, based at least in part on the reporting message; and identifying, from the pairing request, a client-defined statement for the "sensed" pairing condition, and wherein, the notification message includes the client-defined statement.

12. The computer-implemented method of claim 10, further comprising:

determining that the pairing condition is the "not sensed" pairing condition, based at least in part on the reporting message; and identifying, from the pairing request, a client-defined statement for the "not sensed" pairing condition, and wherein, the notification message includes the client-defined statement.

13. The computer-implemented method of claim 10, further comprising:

determining that the pairing condition is the "not sensed" pairing condition, based at least in part on the reporting message;

identifying, from the pairing request, an additional pairing signal type from the plurality of pairing signal types that is to be used by the active IoT device to detect the passive IoT device;

generating additional pairing data that includes the active IoT device identifier, the passive IoT device identifier, and the additional pairing signal type; and transmitting the additional pairing data to the active IoT device.

14. The computer-implemented method of claim 10, wherein the plurality of pairing signal types correspond to a sound signal, a light signal, or a heat signal, or an RF signal that is emitted by the passive IoT device.

15. The computer-implemented method of claim 14, further comprising:

receiving, from the active IoT device, a measurement of an ambient condition that correlates with a medium of the pairing signal type;

determining, that the measurement of the ambient condition is greater than or equal to a predetermined threshold;

identifying, from the pairing request, an additional pairing signal type from the plurality of pairing signal types, the additional pairing signal type being different from the pairing signal type;

generating additional pairing data that includes the active IoT device identifier, the passive IoT device identifier, and the additional pairing signal type; and transmitting the additional pairing data to the active IoT device.

16. One or more non-transitory computer-readable media storing computer-executable instructions that, when executed on one or more processors, cause the one or more processors to perform acts comprising:

receiving, from a client device, a pairing request associated with a first IoT device and a second IoT device, the pairing request further including at least one pairing signal type of a plurality of pairing signal types that is to be used to pair the first IoT device and the second IoT device;

initiating a first electronic handshake with the first IoT device and the second IoT device;

receiving, from the first IoT device, a first electronic handshake response that includes a first IoT device identifier;

receiving, from the second IoT device, a second electronic handshake response that includes a second IoT device identifier;

generating pairing data that includes the first IoT device identifier, the second IoT device identifier, and the pairing signal type;

transmitting the pairing data to the first IoT device and the second IoT device;

receiving a reporting message from at least the first IoT device, based at least in part on the pairing data;

generating a notification message that indicates a pairing condition of the first IoT device and the second IoT device; and transmitting the notification message.

17. The one or more non-transitory computer-readable media of claim 16, further storing instructions that, when executed cause the one or more processors to perform acts comprising:

determining that the pairing condition is a "sensed" pairing condition, based at least in part on the reporting message; and identifying, from the pairing request, a client-defined statement for the "sensed" pairing condition, and wherein, generating the notification message further includes the client-defined statement.

18. The one or more non-transitory computer-readable media of claim 16, wherein the pairing condition is an initial pairing condition, and further storing instructions that, when executed cause the one or more processors to perform acts comprising:

initiating an additional electronic handshake with at least one of the first IoT device or the second IoT device to verify a current pairing condition;

receiving an additional reporting message in response to the additional electronic handshake, the additional reporting message including at least the current pairing condition;

determining that the current pairing condition is different from the initial pairing condition, based at least in part on the additional reporting message;

generating an additional notification message that indicates a change from the initial pairing condition to the current pairing condition; and transmitting the notification message.

19. The one or more non-transitory computer-readable media of claim 18, wherein the additional electronic handshake is performed periodically with at least the first IoT device, based at least in part on a predetermined reporting schedule.

20. The one or more non-transitory computer-readable media of claim 16, wherein at least one of the first IoT device or the second IoT device is a wearable device including an attachment mechanism to attach the wearable device to a person or clothing article worn by a person.

* * * * *